US010654595B1

(12) United States Patent
Reed

(10) Patent No.: US 10,654,595 B1
(45) Date of Patent: May 19, 2020

(54) MAINTAINING HIGH-INCLINATION ECCENTRIC ORBIT USING AN ELECTRODYNAMIC TETHER

(71) Applicant: THE UNITED STATES OF AMERICA AS REPRESENTED BY THE SECRETARY OF THE NAVY, San Diego, CA (US)

(72) Inventor: Phillippe L. Reed, Charleston, SC (US)

(73) Assignee: United States of America as represented by Secretary of the Navy, Washington, DC (US)

( * ) Notice: Subject to any disclaimer, the term of this patent is extended or adjusted under 35 U.S.C. 154(b) by 522 days.

(21) Appl. No.: 15/682,761

(22) Filed: Aug. 22, 2017

(51) Int. Cl.
*B64G 1/64* (2006.01)
*B64G 1/36* (2006.01)
*B64G 1/42* (2006.01)
*B64G 1/40* (2006.01)
*B64G 1/24* (2006.01)
*B64G 1/32* (2006.01)

(52) U.S. Cl.
CPC ............ *B64G 1/648* (2013.01); *B64G 1/242* (2013.01); *B64G 1/32* (2013.01); *B64G 1/36* (2013.01); *B64G 1/40* (2013.01); *B64G 1/42* (2013.01)

(58) Field of Classification Search
CPC ................................ B64G 1/648; B64G 1/242
See application file for complete search history.

(56) References Cited

U.S. PATENT DOCUMENTS

| 3,205,381 A | 9/1965 | Smith | |
|---|---|---|---|
| 3,792,270 A * | 2/1974 | Elmore | B64G 3/00 250/336.1 |
| 4,097,010 A | 6/1978 | Colombo | |
| 4,809,935 A | 3/1989 | Draim | |
| 5,183,225 A | 2/1993 | Forward | |
| 5,669,585 A | 9/1997 | Castiel | |

(Continued)

OTHER PUBLICATIONS

Stone, N., and Bonifazi, C., "The TSS-1R mission: Overview and scientific context," Geophysical Research Letters, vol. 25, No. 41 Feb. 15, 1998, pp. 409-412.
Cosmo, M., and Lorenzini, E., "Tethers in Space Handbook," 3rd Ed., Technical Report under Grant NAGS-1160 for NASA Marshall Space Flight Center, 1997, pp. 2-6.

(Continued)

*Primary Examiner* — Brian M O'Hara
*Assistant Examiner* — Michael B. Kreiner
(74) *Attorney, Agent, or Firm* — Naval Information Warfare Center, Atlantic; Kyle Eppele; Ryan J. Friedl

(57) ABSTRACT

A vehicle, such as a satellite or other spacecraft, includes an electrodynamic tether connected thereto. A processor, contained within the vehicle and connected to the electrodynamic tether, is configured to cause a current to be directed to the electrodynamic tether to cause a change in motion of the vehicle. Sensors, such as an attitude sensor, a position sensor, a magnetometer, and an ionosphere sensor, are contained within the vehicle and are connected to the processor. The processor is configured to direct current to the electrodynamic tether based upon input received from the sensors to maintain the vehicle within a specified orbit, such as a highly-inclined eccentric orbit over the polar or other high-latitude region, or to change the vehicle's orbit. The processor may be configured in a closed-loop configuration to account for measured errors by the sensors position, attitude, ionospheric charge density, and/or the Earth's magnetic field.

18 Claims, 7 Drawing Sheets

(56) References Cited

U.S. PATENT DOCUMENTS

| | | | |
|---|---|---|---|
| 5,931,417 A | 8/1999 | Castiel | |
| 6,116,544 A * | 9/2000 | Forward | B64G 1/10 244/158.2 |
| 6,333,924 B1 | 12/2001 | Porcelli | |
| 6,419,191 B1 * | 7/2002 | Hoyt | B64G 1/10 244/158.2 |
| 6,732,978 B2 * | 5/2004 | Ockels | B64G 1/405 244/166 |
| 6,755,377 B1 * | 6/2004 | Levin | B64G 1/32 244/158.2 |
| 6,942,186 B1 * | 9/2005 | Levin | B64G 1/648 244/158.2 |
| 7,913,954 B2 * | 3/2011 | Levin | B64G 1/44 244/171.5 |
| 9,938,023 B2 * | 4/2018 | Clagett | B64G 1/1021 |
| 2020/0071004 A1 * | 3/2020 | Marchandise | B64G 1/648 |

OTHER PUBLICATIONS

Pollard, J. E., "Simplified Analysis of Low-Thrust Orbital Maneuvers," Aerospace Corporation, Technical Report No. TR-2000(6565)-10, 2000, pp. 10-19.

Ruggiero, A., et al., "Low-Thrust Maneuvers for the Efficient Correction of Orbital Elements," 32nd international Electric Propulsion Conference, Wiesbaden, Germany, Sep. 11-15, 2011, pp. 5.

Petropoulos, Anastassios, "Low-Thrust Orbit Transfers Using Candidate Lyapunov Functions with a Mechanism for Coasting," AIAA/AAS Astrodynamics Specialist Conference, Providence, RI, Aug. 16-19, 2004.

Pearson, et al., "Orbital Maneuvering with Spinning Electrodynamic Tethers," AIAA, 2004-5715, 2nd International Energy Conversion Engineering Conference, Providence, Rhode Island, Aug. 2004.

Pearson, et al., "An Update on EDDE, the ElectroDynamic Delivery Express", Fifth International Conference on Tethers in Space, May 24-26, 2016, Ann Arbor, Michigan, pp. 2-3.

* cited by examiner

MAINTAINING HIGH-INCLINATION ECCENTRIC ORBIT USING AN ELECTRODYNAMIC TETHER

FEDERALLY SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Atlantic, Code 70F00, North Charleston, S.C., 29419-9022; voice (843) 218-3495; email ssc_lant_T2@navy.mil; reference Navy Case Number 106637.

BACKGROUND

Maintaining satellite coverage of certain areas, such as the Polar Regions, for communications or surveillance is extremely difficult. Geostationary (or near-geostationary) satellites provide good persistent coverage of large areas, but are constrained to coverage latitudes below about 60° North or South. Above 60° N, ground terminals have a low elevation angle to the satellite, increasing signal attenuation from the atmosphere, geographic features, vegetation, etc.

Systems intended for complete global coverage rely on upwards of thirty or more separate spacecraft in spaced orbits and are therefore considerably complex and expensive. Sun-synchronous orbits cross the poles, but with a very short dwell time (a few minutes), and would require similarly high numbers of satellites for continuous polar coverage. Molniya or Tundra orbits are often used for long term high latitude coverage, but they are only stable at 63.4 degrees inclination, and are thus limited to direct coverage below 63.4 degrees. An otherwise identical orbit inclined at 90 degrees would start out with apogee directly over the North (or South) Pole, but its line of apsides would gradually rotate such that very little time on orbit would be spent over the pole. Conventional chemical or electric propulsion methods would not be practical for maintaining such highly-inclined eccentric orbits.

DETAILED DESCRIPTION OF SOME EMBODIMENTS

Figure 1:
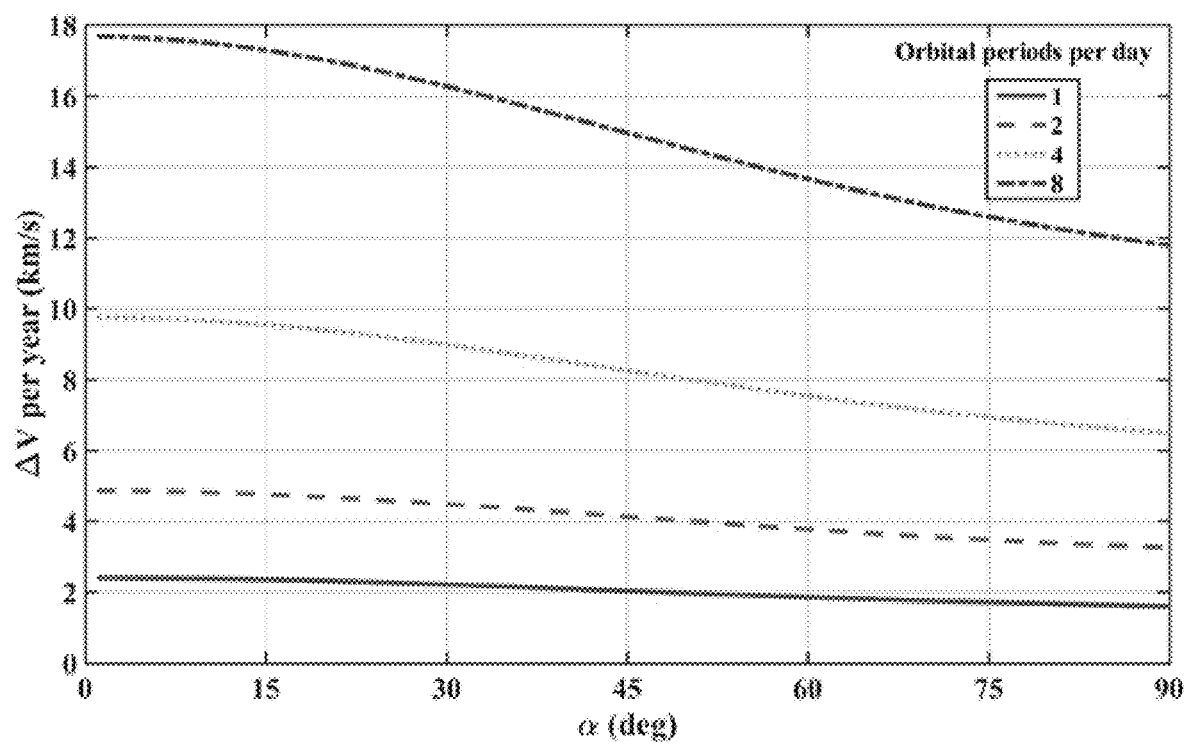
FIG. 1 shows a graph illustrating the required change in velocity to maintain argument of perigee for an orbit at 90 degrees inclination and 300 km perigee altitude as a function of burn arc angle for various orbital periods per day.

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

The disclosed embodiments provide a system and method for maintaining long-duration direct satellite coverage of regions such as Earth's north and/or south Polar Regions. The systems and methods primarily address limitations in satellite systems using naturally stable orbits for polar coverage. These traditional orbits, including Molniya, Tundra, geostationary, and high-inclination low-earth orbits, suffer from either limitations in the highest latitude of direct coverage or a large number (dozens) of satellites required to maintain constant high-latitude coverage.

To date, the best option for long-time coverage of Polar Regions has been the Molniya orbit. The Molniya orbit is highly elliptical with a period of 12 hours, alternating coverage between the Eastern and Western hemispheres. Its apogee is selected such that it dwells for the most time over high latitudes in the northern hemisphere. The orbit inclination is selected such that the mean rate of change in argument of perigee, caused by a net torque on the orbit from the Earth's oblateness, see Eq. (1) below, is zero. This occurs at an inclination of 63.4 degrees (or 116.6 degrees for a retrograde orbit). For higher inclinations, the line of apsides will slowly rotate, eventually causing the spacecraft to spend a considerable amount of time over lower latitudes and then the southern hemisphere.

$$\frac{d\omega}{dt} = \frac{3}{4} J_2 \left(\frac{R_E}{p}\right)^2 n(5\cos^2 i - 1) \quad \text{(Eq. 1)}$$

Despite its advantages, the Molniya orbit is still limited in its polar coverage. The maximum latitude of the satellite's ground track is 63.4 degrees north. The elevation angle from one ground station (in Canada, for instance) is very low when the spacecraft has apogee over the other side of the Earth (e.g., Russia), making direct across-the-pole communication difficult. The Molniya orbit is also not optimal for polar imaging, because of the large apogee distance and because of the large slant angle (at least 26.6 degrees) to the pole. The dwell time of a Molniya orbit can be increased (requiring fewer satellites for continuous coverage) by changing the period to 24 hours (a "tundra" orbit), but this significantly increases the apogee distance, increasing path losses and delay time for communications.

A spacecraft with the same orbital parameters as a Molniya satellite, except at 90 degrees inclination (providing direct polar coverage), will gradually drift so that its apogee dwell will no longer be over the North pole, but lower and lower latitudes. Only a small fraction of its lifetime would provide direct polar coverage. The only way to counteract this rotation of the line of apsides for a polar orbit is to frequently perform corrective maneuvers. One method would be to simply try to apply a thrust to directly counteract the gravitational perturbation from Earth's oblateness at all times. This would be suboptimal in terms of fuel consumption, require a complex steering routine, and complicate or prevent operations of most types of payloads.

Pollard, in a technical report titled "Simplified Analysis of Low-Thrust Orbital Maneuvers," discusses a method for adjusting the argument of perigee by using apogee- and perigee centered burn arcs sweeping out α degrees in eccentric anomaly, that is, $-\alpha \leq E \leq \alpha$ and $180°-\alpha \leq E \leq 180°+\alpha$. While sub-optimal, Pollard's choice of a thrust vector aligned parallel to the semi-major axis yields an analytical solution, see Eq. (2) below, for the required ΔV to counteract the natural rotation of the line of apsides. The results for several 90°-inclination, highly elliptical orbits are shown in graph 100 of FIG. 1.

The required ΔV for maintaining a Molniya-type orbit (dashed line) for just one year is about 3 km/s for continuous low thrust or about 5 km/s for pairs of impulsive burns. This is considerably higher than the typical station-keeping budget for an entire lifetime of most Earth-orbiting satellites. Even a modest increase in inclination to just 65° N for a Molniya-like orbit would still require 1 km/s per year to offset the change in argument of perigee.

$$\Delta V = \frac{3}{2} \frac{\mu}{a^2} \frac{e}{\sqrt{1-e^2}} \frac{\alpha J_2(R_E^2/p^2)(5\cos^2 i - 1)}{3\alpha - \sin\alpha \cos\alpha} \Delta t \quad \text{(Eq. 2)}$$

Ruggiero et al., in a publication titled "Low-Thrust Maneuvers for the Efficient Correction of Orbital Elements," have determined optimal in-plane and out-of-plane angles at which to conduct an impulsive burn to change the argument of perigee. Similarly, Petropoulos, in a publication titled "Low-Thrust Orbit Transfers Using Candidate Lyapunov Functions with a Mechanism for Coasting," provides the optimal true anomaly at which to conduct an in-plane burn to change the argument of perigee. Thus, a burn conducted at optimal true anomaly in the optimal in-plane direction will provide the maximum change in argument of perigee for a given thrust.

Figure 2:
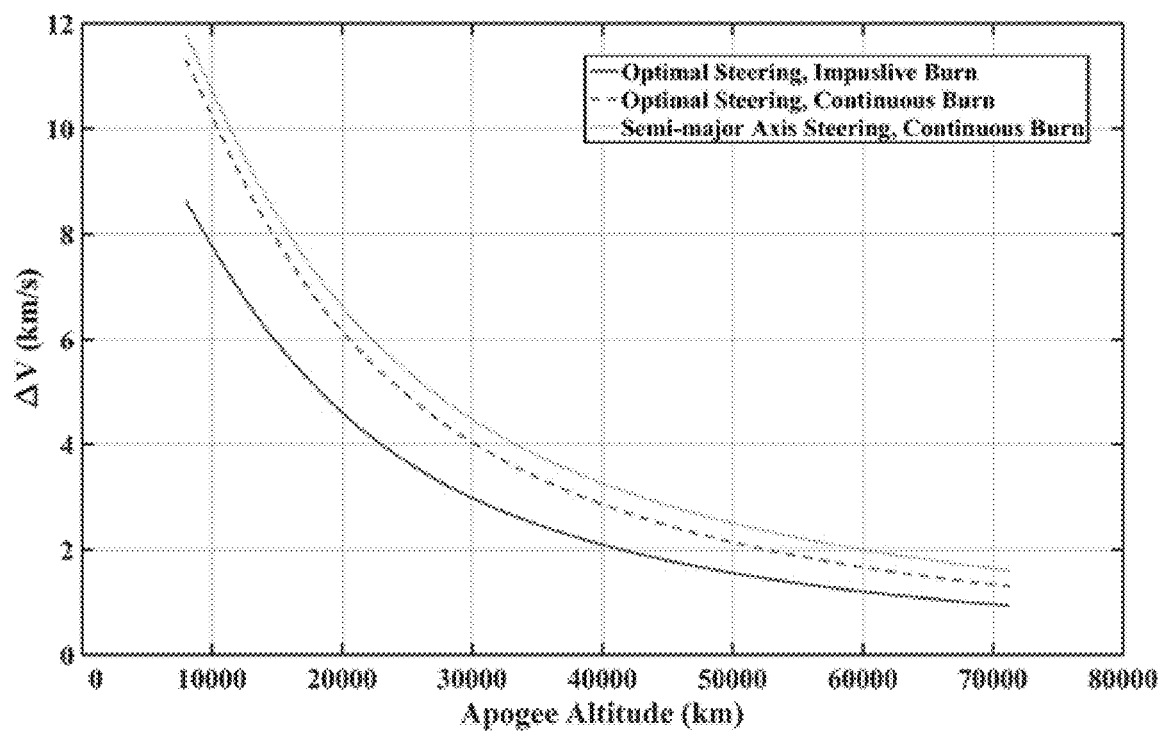
FIG. 2 shows a graph illustrating the required change in velocity to maintain argument of perigee for orbit at 90 degrees inclination and 300 km perigee altitude as a function of apogee altitude.

While it is straightforward to determine analytically the change in argument of perigee from a fixed ΔV using such an optimum impulsive burn, the inverse problem does not have an apparent analytical solution. Therefore, the required ΔV to maintain the argument of perigee is determined numerically, as well as the ΔV required using a continuous burn oriented in the optimal in-plane direction at every instant. The results are shown as a function of apogee altitude in graph 200 of FIG. 2. The required ΔV for semi-major axis steering from Eq. (2) is also shown for comparison. The optimally-oriented continuous burn requires a ΔV of 2.9 km/s to maintain the Molniya-type orbit at 90° inclination, and the optimum impulsive burn requires 2.1 km/s. Conventional chemical or electric propulsion methods are therefore not practical for maintaining such highly inclined eccentric orbits for any significant length of time.

The disclosed embodiments provide a system and method in which an electro-dynamic tether provides thrust to a space vehicle in a controlled magnitude and direction for the purpose of extending the duration of polar or high latitude coverage and decreasing the slant angle from a polar or high latitude target to the satellite (i.e., extending direct coverage to higher latitudes). The use of an electro-dynamic tether allows for long-term control of a spacecraft in otherwise unstable orbits.

By providing thrust in a specific way, the natural precession of an inclined elliptical orbit's line of apsides is countered, allowing a fixed argument of perigee to be maintained indefinitely. If this thrust were not applied, either the orbit would have to be fixed at an inclination for which the argument of perigee is stable (e.g., 63.4 degrees for a Molniya orbit) or the argument of perigee would drift over time (several degrees per month), meaning the vehicle would spend less and less time over the desired target latitude.

The disclosed embodiments generate thrust as a Lorentz force by passing a current 1 through the electrodynamic tether of length L in the presence of the Earth's magnetic field. The current is maintained in a single direction by collecting electrons from the ionosphere at one end of the electrodynamic tether and emitting them at the other end, since an internal loop for maintaining a current would result in zero net force. Hence, the only thrust on the spacecraft will be generated within the ionosphere. A boundary is defined for the ionosphere, $r_0$, beyond which the electrons are assumed to be too dispersed to maintain the current. Even if current can be generated beyond $r_0$, the Lorentz force would decrease rapidly because the magnetic field strength falls off with the cube of the distance from the Earth.

Since the dipole approximation of the magnetic field is symmetric about the Earth's polar axis, it can be completely described in terms of a radial and a transverse component. Thus for an orbit at 90° inclination, the magnetic field at the location of the spacecraft can be represented as a simple function of the true anomaly, v. In radial ($\hat{e}_r$) and transverse ($\hat{e}_v$) components, the magnetic field can be written as:

$$\vec{B}(v) = B_0 \left(\frac{R_E}{r(v)}\right)^3 (2\cos v \, \hat{e}_r + \sin v \, \hat{e}_v) \quad \text{(Eq. 3)}$$

For now, assume a constant current, I, through the tether of length, l, which is oriented perpendicular to the orbital plane. Then the Lorentz force (i.e., thrust) is simply:

$$\vec{F}(v) = Il\hat{k} \times \vec{B}(v) = IlB_0 \left(\frac{R_E}{r(v)}\right)^3 [-\sin v \, \hat{e}_r + 2\cos v \, \hat{e}_v] \quad \text{(Eq. 4)}$$

Applying standard conversions from Eq. (5), the components of thrust per unit mass (i.e., acceleration) are obtained in the radial and transverse directions as functions of the eccentric anomaly, E, in Eqs. (6) and (7).

$$\cos v = \frac{a(\cos E - e)}{r}, \sin v = \frac{a\sqrt{1-e^2}\sin E}{r}, \quad \text{(Eq. 5)}$$
$$r = a(1 - e\cos E)$$

$$f_r(E) = -\frac{IlB_0}{m}\left(\frac{R_E}{a}\right)^3 \frac{\sqrt{1-e^2}\sin E}{(1-e\cos E)^4} \quad \text{(Eq. 6)}$$

$$f_v(E) = \frac{2IlB_0}{m}\left(\frac{R_E}{a}\right)^3 \frac{\cos E - e}{(1-e\cos E)^4} \quad \text{(Eq. 7)}$$

Following the method employed by Pollard, substitute the thrust components into the appropriate Lagrange planetary equation, Eq. (8), to obtain an expression for the rate of change in argument of perigee as a function of eccentric anomaly, Eq. (9).

$$\frac{d\omega}{dE} = \frac{a^2}{\mu e}\left[-f_r\sqrt{1-e^2}(\cos E - e) + f_v(2 - e^2 - e\cos E)\sin(E)\right] \quad \text{(Eq. 8)}$$

$$\frac{d\omega}{dE} = \frac{IlB_0}{m}\frac{R_E^3}{\mu ea}\sin E\left[\frac{-2e\cos^2 E + (5-e^2)\cos E + 3e^3 - 5e}{(1-e\cos E)^4}\right] \quad \text{(Eq. 9)}$$

To find the total achievable change in argument of perigee from electrodynamic thrust, integrate Eq. (Eq. 9) from E=0 (perigee) to E=E$_0$ (the edge of the ionosphere). By reversing the current for the arc prior to perigee (i.e., $-E_0 \leq E \leq 0$) in Eq. (10), we can double the total change in argument of perigee and cancel out changes to the semi-major axis and eccentricity. Performing the integration and using the conversions in Eq. (11) results in Eq. (12), an analytical expression for the change in argument of perigee as a function of $r_0$.

$$\Delta\omega = \int_0^{E_0} \frac{d\omega}{dE}dE - \int_{-E_0}^0 \frac{d\omega}{dE}dE = 2\int_0^{E_0}\frac{d\omega}{dE}dE \quad \text{(Eq. 10)}$$

$$r_p = a(1-e), r_0 = a(1 - e\cos E_0) \quad \text{(Eq. 11)}$$

$$\Delta\omega = 2B_0 \frac{Il}{m}\frac{R_E^3}{\mu ea}g(r_0), \quad (1)$$

$$g(r_0) =$$
$$\frac{1}{e^2}\left[-a^3(e^2-1)^2\frac{(r_p^3 - r_0^3)}{r_p^3 r_0^3} + a^2(1-e^2)\frac{(r_p^2 - r_0^2)}{2r_p^2 r_0^2} + 2a\frac{(r_p - r_0)}{r_p r_0}\right]$$

Generally, the electrodynamic tether is oriented perpendicular to the orbital plane. The thrust then operates generally in the plane of the orbit, which will serve to change the argument of perigee, eccentricity, and semi-major axis of the orbit. The total possible change in argument of perigee can be doubled (or for a specific required change in argument of perigee, the required current or length can be halved) by reversing the direction of current at perigee. This can be accomplished either by rotating the tether 180 degrees near perigee or by including a cathode and anode on each end of the tether, and switching which end collects electrons and which end emits electrons. The reversal of current at perigee will also serve to cancel out changes in semi-major axis and eccentricity that would otherwise occur. Hence, the system will maintain all orbital elements of a particular starting orbit, and maintain an argument of perigee such that the apogee dwell will occur over the same latitude.

Figure 3:
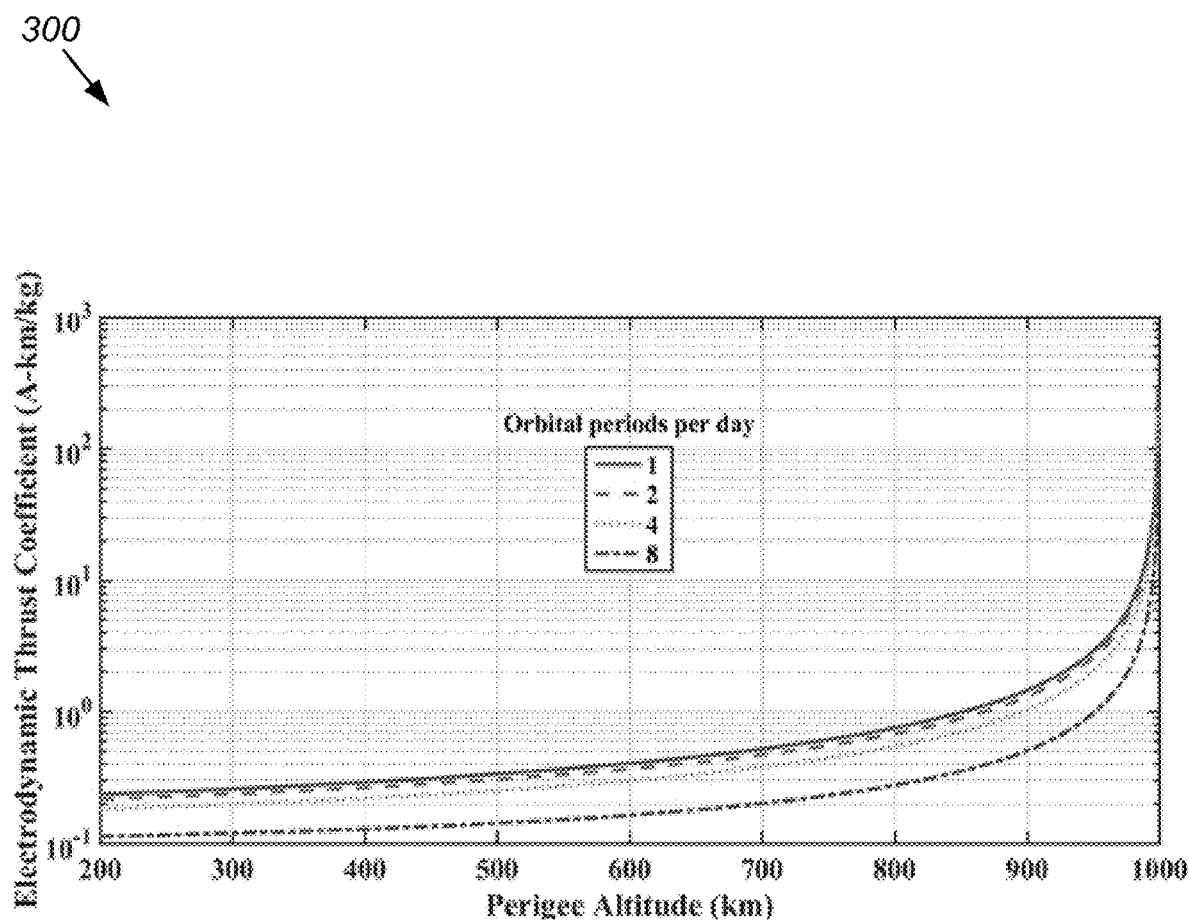
FIG. 3 shows a graph illustrating electrodynamic thrust coefficient, as a function of perigee altitude, required to maintain argument of perigee for orbit at 90 degrees inclination for apogee altitudes that result in various orbital periods per day.

There are three primary design parameters involved to maintain the argument of perigee, i.e., cancel out the natural precession of the line of apsides, namely the length of the tether, the current passed through the tether, and the total system mass. The ratio of the product of length and current to mass is referred to as the "electrodynamic thrust coefficient." FIG. 3 shows a graph 300 illustrating electrodynamic thrust coefficient, as a function of perigee altitude, required to maintain argument of perigee for orbit at 90 degrees inclination. Results are shown for apogee altitudes that result in 1, 2, 4, and 8 orbital periods per day.

For the sake of comparison, we define a Molniya-type reference orbit, a 90 degree inclined semi-synchronous orbit with 300 km perigee altitude. For this orbit, the required electrodynamic thrust coefficient is 0.24 A·km/kg. One tether system in development by Star Technology and Research, Inc., a 12U CubeSat with a proposed mass of 30 kg and conductor length of 8 km, is expected to generate on the order of 1 A of current. This tether spacecraft would have an electrodynamic thrust coefficient of 0.27 A·km/kg. This would leave enough margin for approximately 3 to 4 kg of payload mass. Further advances in materials science, spacecraft design, and electronics miniaturization will render the disclosed embodiments even more capable of maintaining polar orbits for larger and/or more advanced spacecraft in the future.

Figure 4:
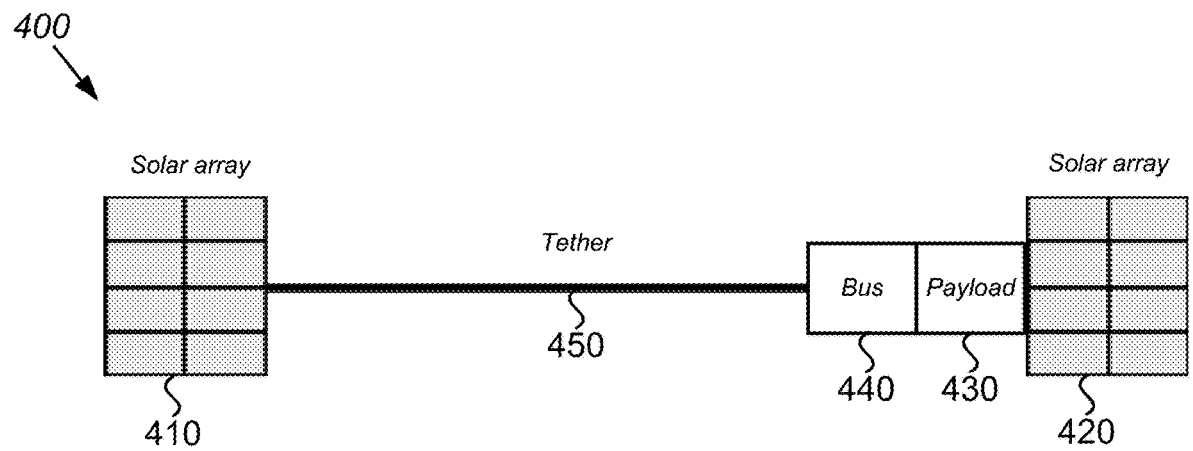
FIG. 4 shows a diagram illustrating an embodiment of a system in accordance with the embodiments of the systems and methods disclosed herein.

FIG. 4 shows a diagram illustrating an embodiment of a system 400 in accordance with the embodiments of the systems and methods disclosed herein. System 400 includes solar arrays 410 and 420, a payload 430, a bus 440, and an electrodynamic tether 450. Solar arrays 410 and 420 may be used to provide power to the various components within system 400, including electrodynamic tether 450. Although two solar arrays are shown in FIG. 4, in some embodiments system 400 may only include one or may include more than two solar arrays. Payload 430 includes the mission-oriented equipment such as communications equipment and/or a camera for, as an example, capturing the Earth's imagery. Bus 440 may be used to house some or all of the equipment/components/sensors used for system 400, such as those shown in FIG. 5, including those to control the electrodynamic tether and to perform tasks such as vehicle maintenance.

In some embodiments, payload 430 and bus 440 are connected to one of the solar arrays 420, as shown, with tether 450 connected on one end to bus 440. The other end of tether 450 may be disconnected from any components of system 400. In such embodiments, solar array 410 may be connected via a cable and support mechanism (not shown) to bus 440 and the other components of system 400. It should be recognized, however, that the various components in system 400 may be connected in a variety of configurations depending upon, for example, the number of solar arrays used, the size of the vehicle, the nature of payload 430, and/or the length of the electrodynamic tether 450.

For clarity, system 400 is considered a "vehicle" as used herein. In some embodiments, the "vehicle" is a satellite or other spacecraft that is capable of maintaining orbit. As used herein, the term "orbit" refers to a curved path followed by an object revolving around another object in space, under the influence of gravitation.

Figure 5:
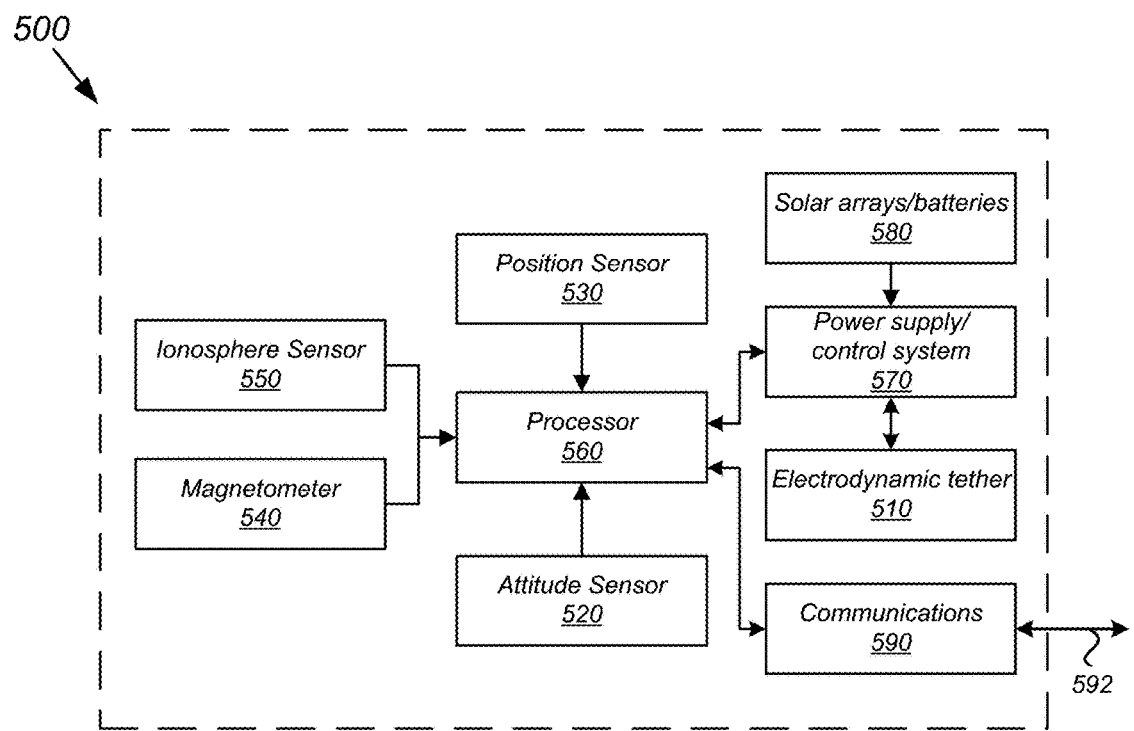
FIG. 5 shows a block diagram illustrating components of an embodiment of a system in accordance with the system and methods disclosed herein.

FIG. 5 shows a diagram illustrating components of an embodiment of a system 500 that may be used in accordance with the embodiments disclosed herein. For example, system 500 may be incorporated into system 400 shown in FIG. 4. As shown, system 500 includes an electrodynamic tether 510 and a suite of sensors for various measurements. Various types of tethers known in the art may be used for the systems disclosed herein. Examples of electrodynamic tethers are found in U.S. Pat. No. 6,942,186 to Levin et al. and U.S. Pat. No. 6,116,544 to Forward et al., the content which are fully incorporated by reference herein.

System 500 includes an attitude sensor 520 and position sensor 530 to monitor the attitude and position, respectively, of a vehicle (see FIG. 4) attached to electrodynamic tether 510. System 500 further includes a magnetometer 540 to measure the Earth's magnetic field and an ionosphere sensor 550 to measure the ionospheric charge density. In some embodiments, the plurality of sensors 520, 530, 540, and 550 are contained within the vehicle and connected to processor 560 as shown. Processor 560 is configured to cause a current to be supplied to electrodynamic tether 510 based upon input received from the plurality of sensors to cause a change in motion of the vehicle and/or to maintain the vehicle within a specified orbit.

For example, if attitude sensor 520 and position sensor 530 indicate that system 500 is proceeding out of the specified orbit, processor 560 is configured to determine the appropriate amount of current that needs to be supplied to electrodynamic tether 510 to create the appropriate amount of thrust in a particular direction for the appropriate amount of time to cause system 500 to maintain the current specified orbit. Similarly, if changes occur in the Earth's magnetic field as measured by magnetometer 540 or the ionosphere as measured by ionosphere sensor 550, processor is configured determine the appropriate amount of current that needs to be supplied to electrodynamic tether 510 to create the appropriate amount of thrust in a particular direction for the appropriate amount of time to cause system 500 to maintain the current specified orbit.

In some embodiments, processor 560 is connected to a power supply/control system 570, which is connected to solar arrays/batteries 580 and electrodynamic tether 510. Through controlling power supply/control system 570, processor is configured to direct power from solar arrays/batteries 580 to electrodynamic tether 510. In embodiments where power supply/control system 570 is connected to batteries, the batteries may be connected to solar arrays to store the power being generated by the solar arrays.

As an example, the specified orbit may be an orbit between about 60 and 90 degrees inclination with the argument of perigee selected and maintained such that apogee dwell occurs between about 60 degrees north latitude and about 90 degrees north latitude. As a further example, the specified orbit may be selected and maintained such that the apogee dwell occurs between about 60 degrees south latitude and about 90 degrees south latitude.

Processor 560 receives input from the various sensors including attitude sensor 520, position sensor 530, magnetometer 540, and ionosphere sensor 550. Processor 560 is configured with software installed therein to monitor the sensor information to determine the appropriate amount of current to provide to electrodynamic tether 510 for thrusting to maintain the attached vehicle at a desired trajectory, such as a desired argument of perigee, or within a desired orbit. The desired argument of perigee may be pre-programmed into processor 560 or may be wirelessly transmitted from an operator of system 500 to the vehicle through communications module 590 for example, which in turn sends the information to processor 560.

In some embodiments, a closed-loop controller configuration is used, wherein processor 560 monitors inputs from attitude sensor 520 and position sensor 530 to determine if the current to electrodynamic tether 510 is generating the correct force in the correct direction, and to make appropriate adjustments based upon the measured errors in position and attitude and any measured changes in the ionospheric charge density as measured by ionosphere sensor 550 and/or the Earth's magnetic field as measured by magnetometer 540.

In some embodiments, as an alternative to the closed-loop controller, an open loop controller may be used. This would not require any external sensor feedback, thereby reducing the cost, weight, and complexity of the system. However, processor 560 would not be able to account for errors in assumed states of magnetic field strength, ionospheric density, vehicle position and attitude, etc., and the resulting maneuvers would be sub-optimal. This open loop control method may be sufficient for maintaining the argument of perigee for a short time (better than the natural drift), but errors would continue to grow.

In some embodiments, system 500 further includes a communications module 590 connected to processor 560. Communications module 590 is configured to wirelessly receive additional information from or transmit information to an external source via signal 592. Examples of information received by communications module 590 include new instructions for the payload (e.g., targets of interest for Earth observation or communications/waveform parameters for a communications payload), requests for health and status check from the spacecraft (bus or payload) or other diagnostics/maintenance related data or instructions, and non-locally sensed space environment data (i.e., ground- or air-based measurements of the ionosphere or magnetic field) or spacecraft data (position/attitude). The additional information received may be transmitted to processor 560. Processor 560 is configured to receive the additional information from communications module 590 and, in some embodiments, to modify the current supplied to electrodynamic tether 510 in response to the additional information.

In some embodiments, as an alternative to hosting a position sensor 530 on the vehicle, the vehicle position could be tracked from another location, such as a fixed ground site or another vehicle, and the position information can be uploaded to the vehicle. This information would need to be provided to the vehicle in time for it to make the appropriate adjustments to electrodynamic tether 510 to provide the correct magnitude and direction of thrust to execute the maneuver required to maintain argument of perigee. Similarly, the attitude of the vehicle or the charge density of the ionosphere could be monitored and transferred to the vehicle from a remote system.

In some embodiments, electrodynamic tether 510 comprises a stationary tether. An alternative to using a stationary tether would be to introduce a slow spin to the tether, as described in U.S. Pat. No. 6,942,186 to Levin et al. A spinning tether would maintain better stability of the tether itself, preventing unwanted dynamical modes from bending the tether out of its desired orientation. This would decrease the total amount of useful thrust (or payload mass for a fixed required thrust to maintain argument of perigee), as the tether would not always be oriented in the optimal direction, but it would prevent other inefficiencies and loss of thrust that would result from unwanted modes in the tether. In some embodiments, lower-thrust propulsion devices (such as smaller traditional rocket thrusters, smaller tethers, or solar sails) are attached at intervals around electrodynamic tether 510 to attempt to counteract the uneven forces acting on electrodynamic tether 510 and maintain stability.

Figure 6A:
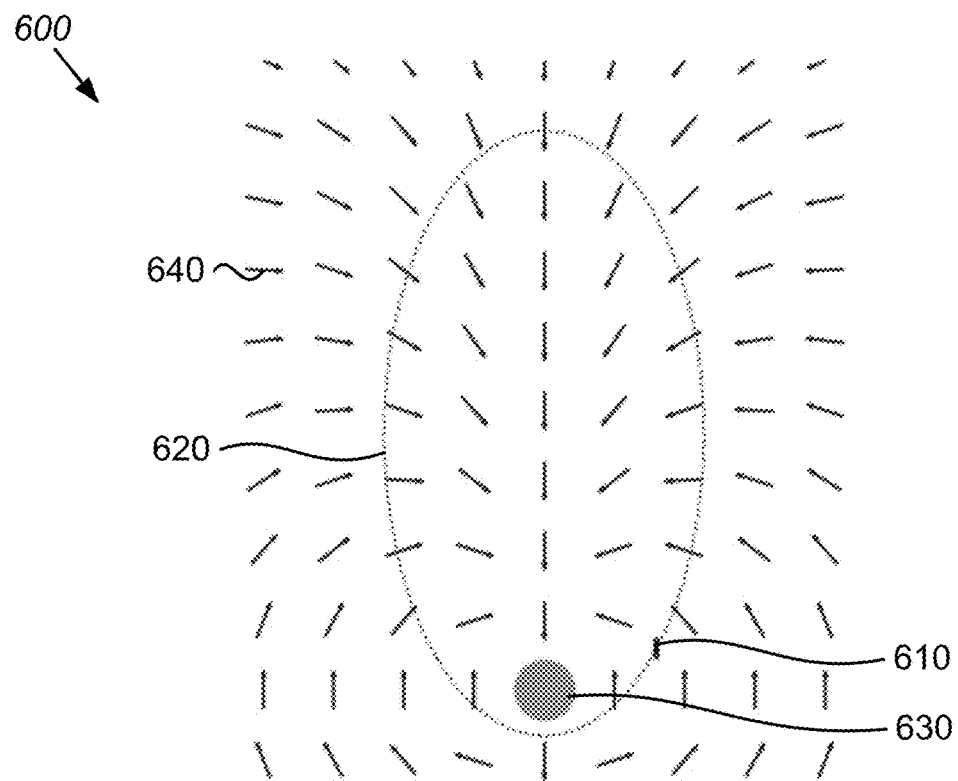
FIGS. 6A-6C show diagrams illustrating a normal view, side view, and close-up side view, respectively, of the system shown in FIG. 4 in orbit along with the Earth's magnetic field lines.
Figure 6B:
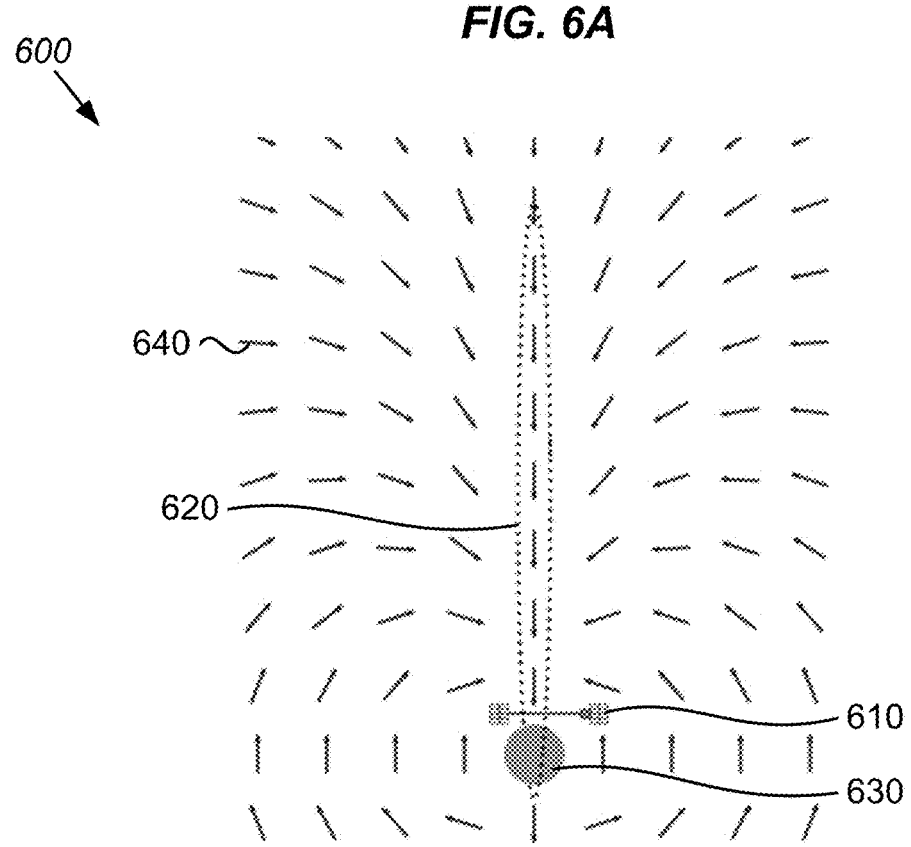
Figure 6C:
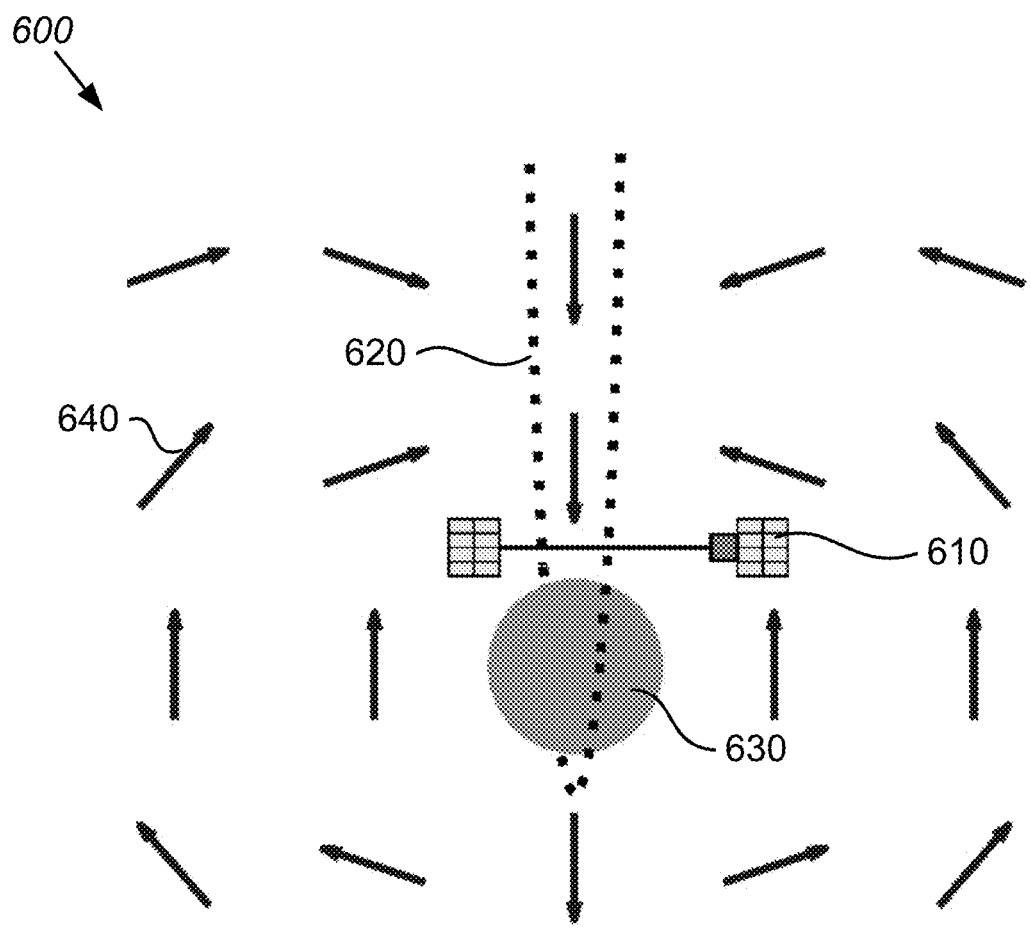

FIGS. 6A-6C shows diagrams 600 illustrating an orbit-normal view, side view, and close-up side view, respectively, of the system shown in FIG. 4 in orbit along with the Earth's magnetic field lines. As shown, system 610 is in orbit 620 around object 630 (e.g. Earth), with the associated magnetic field lines 640. As can be seen in FIGS. 6A-6C, orbit 620 is a high-inclination, highly-elliptical orbit. It should be noted that FIGS. 6A-6C are not to scale.

Figure 7:
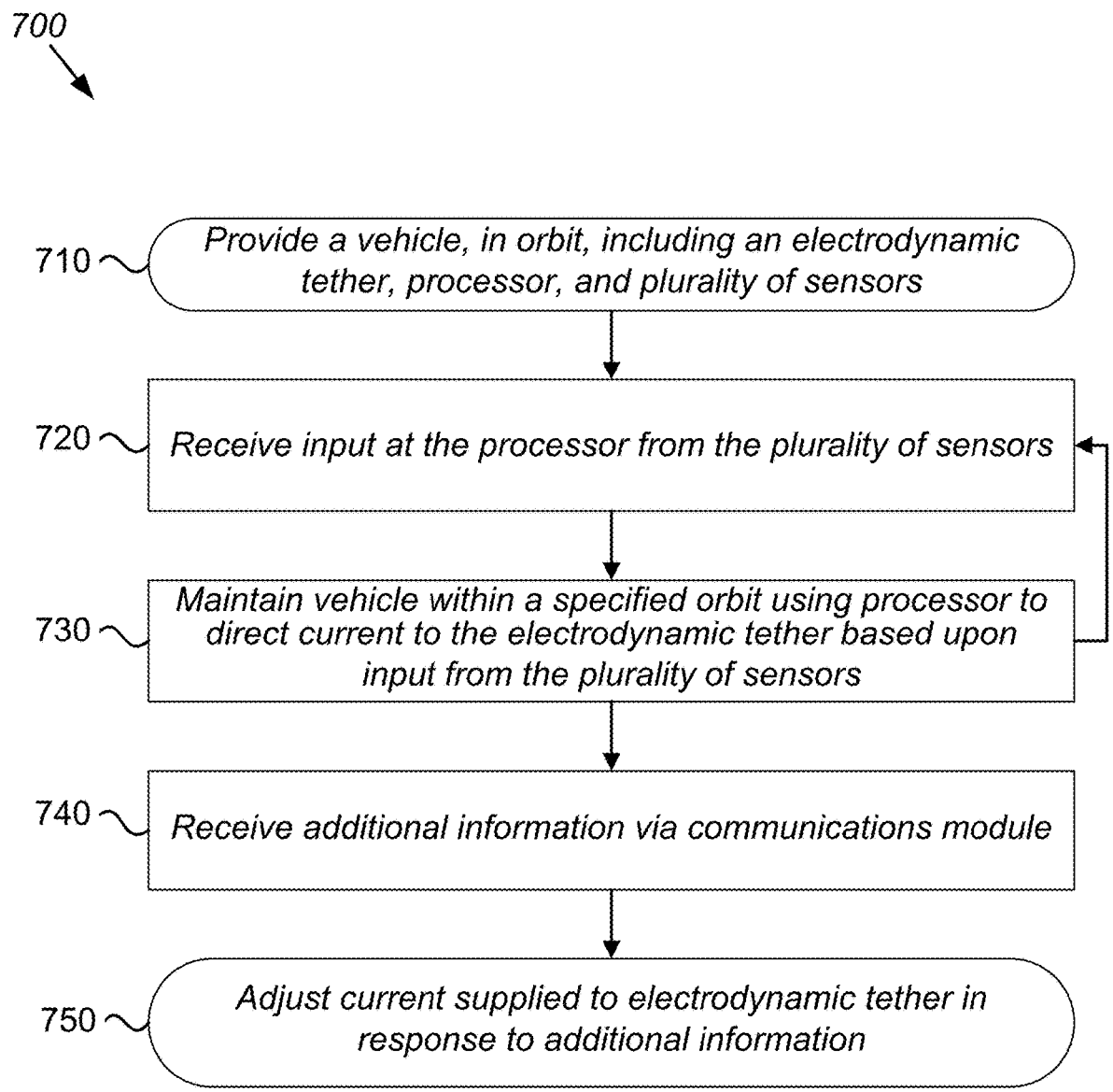
FIG. 7 shows a flowchart of an embodiment of a method in accordance with the system and methods disclosed herein.

FIG. 7 shows a flowchart of an embodiment of a method 700 in accordance with the disclosed embodiments. Some or all of the steps of method 700 may be performed by a system such as system 400 shown in FIG. 4 incorporating the components shown in system 500 in FIG. 5. Further, while FIG. 7 shows one embodiment of method 700 including steps 710-750, other embodiments of method 700 may contain fewer steps or more steps. Further, while in some embodiments the steps of method 700 may be performed as shown in FIG. 7, in other embodiments the steps may be performed in a different order, or certain steps may occur simultaneously with one or more other steps.

Method 700 may begin at step 710, which involves providing a vehicle 400 in orbit, the vehicle including an electrodynamic tether 450/510 connected thereto and a processor 560 contained therein and connected to electrodynamic tether 450/510, where the processor 560 is configured to supply current to electrodynamic tether 450/510 to cause a change in motion of the vehicle 400. Step 720 involves receiving, at the processor 560, input from a plurality of sensors, such as sensors 520, 530, 540, and 550, contained within the vehicle 400 and connected to the processor 560.

Step 730 involves maintaining the vehicle 400 within a specified orbit 620 by supplying current to the electrodynamic tether 450/510 based upon input received from the plurality of sensors 520, 530, 540, and 550. As there may be many iterations between steps 720 and 730 to maintain an orbit, method 700 may route back to step 720 throughout the process as shown by the arrow. Step 740 involves receiving additional information from a communications module 570 connected to processor 560. Step 750 involves modifying, using processor 560, the current supplied to electrodynamic tether 440/510 in response to the additional information received via communications module 570.

Some or all of the steps of method 700 may be stored on a non-transitory processor readable storage medium, wherein the steps are represented by processor readable programming code. The steps of method 700 may also be processor-implemented using a programmable device, such as a processor-based system. Method 700 may comprise instructions that, when loaded into a processor-based system, cause the system to execute the steps of method 700. Method 700 may be implemented using various programming languages, such as "Java", "C", or "C++".

Various storage media, such as magnetic processor disks, optical disks, and electronic memories, as well as processor readable media and processor program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a processor disk containing appropriate materials, such as a source file, an object file, or an executable file, were provided to a processor, the processor could receive the information, appropriately configure itself, and perform the functions of the various systems and methods outlined in the diagrams and flowcharts above to implement the various functions. That is, the processor could receive various portions of information from the disk relating to different elements of the above-described systems and/or methods, implement the individual systems and/or methods, and coordinate the functions of the individual systems and/or methods.

The disclosed systems and methods provide two main advantages over other existing satellite systems designed for polar coverage. First, they can provide direct polar coverage. Second, they can provide continuous or nearly continuous coverage over high latitude regions using much fewer satellites than existing systems. The disclosed embodiments provide direct coverage over 90 degrees latitude (or any other specific latitude), whereas Molniya or tundra orbits are limited to approximately 63.4 degrees. An orbit with all other parameters the same as a Molniya orbit except with inclination at 90 degrees north (to provide direct north polar coverage) will over the course of several months see its apogee drift toward the equator and then the South Pole. Hence, it will not be able to provide long-term coverage over the poles since the apogee drift will mean most of the spacecraft's time will be spent over a different latitude. The disclosed systems and methods prevent the apogee in such an orbit from drifting, and thus maintain long-term coverage more directly over the North or South Pole (or other desired latitude).

With a Molniya orbit, the highest latitude of direct coverage is 63.4 degrees at the instant of apogee. With the disclosed embodiments, just two spacecraft can continually and directly cover a latitude of at least 67.2 degrees. A constellation in a circular orbit would require at least 8 satellites to keep one directly over a latitude of at least 67.2 degrees at all times. Three satellites using the disclosed embodiments provide continual direct coverage over at least 75.9 degrees. A circular orbit regime would require at least 13 spacecraft to achieve this.

Other embodiments may maintain the argument of perigee for the highly inclined orbit at different semi-major axis or eccentricity than those of the Molniya orbit. By reducing the semi-major axis, the apogee can be brought closer to the Earth's surface over Polar Regions, with a corresponding reduction in dwell time. Conversely, dwell time directly over high latitudes can be increased, with a corresponding increase in apogee distance. In either case, the duration of direct coverage over the desired high latitude will be longer than when using an equivalent stable orbit. Hence a constellation of satellites using this system will require fewer satellites for direct high-latitude coverage than the corresponding stable high-inclination orbit or a circular orbit.

While the disclosed embodiments have been discussed with reference to a space vehicle (e.g. satellite) maintaining orbit over the Polar Regions, it should be noted that the embodiments are not limited thereto. For example, the disclosed embodiments may be used to maintain a space vehicle at specific latitude coverage over geographic areas other than the poles, for instance over a particular city/country, body of water, etc.

Additionally, the disclosed embodiments may be used for long-duration polar coverage of additional planets, moons, or other celestial bodies, provided they have a magnetic field and ionosphere. Jupiter, for instance, has a strong magnetic field and an ionosphere, and so might be suitable for the use of the disclosed systems and methods.

The language used in the specification has been principally selected for readability and instructional purposes, and may not have been selected to delineate or circumscribe the inventive subject matter. Accordingly, the disclosure of the inventive subject matter is intended to be illustrative, but not limiting, of the scope of the invention, which is set forth in the following claims.

Further, many modifications and variations of the embodiments disclosed herein are possible in light of the above description. Within the scope of the appended claims, the disclosed embodiments may be practiced otherwise than as specifically described. Further, the scope of the claims is not limited to the implementations and embodiments disclosed herein, but extends to other implementations and embodiments as may be contemplated by those having ordinary skill in the art.

I claim:

1. A system comprising:
   a vehicle having an electrodynamic tether connected thereto;
   a processor contained within the vehicle and connected to the electrodynamic tether, the processor configured to cause a current to be directed to the electrodynamic tether to cause a change in motion of the vehicle; and
   a plurality of sensors contained within the vehicle and connected to the processor, wherein the processor is configured to direct current to the electrodynamic tether based upon input received from the plurality of sensors to maintain the vehicle within a specified orbit;
   wherein the specified orbit has an inclination angle that is greater than 63.4 degrees and less than or equal to 90 degrees, with apogee positioned between above 63.4 degrees North latitude and about 90 degrees North latitude.

2. The system of claim 1, wherein the plurality of sensors comprise an attitude sensor, a position sensor, a magnetometer, and an ionosphere sensor.

3. The system of claim 2, wherein the processor is configured in a closed-loop configuration to account for measured errors by the plurality of sensors in one or more of position, attitude, ionospheric charge density, and Earth's magnetic field.

4. The system of claim 1, wherein the vehicle is a satellite.

5. The system of claim 1 further comprising a communications module, connected to the processor, configured to wirelessly receive additional information and transmit the additional information to the processor, wherein the processor is configured to receive the additional information from the communications module and to modify the current directed to the electrodynamic tether in response to the additional information.

6. The system of claim 1 further comprising:
   a power supply/control system connected to the processor and the electrodynamic tether; and
   at least one solar array connected to the power supply/control system.

7. A system comprising:
   a vehicle having an electrodynamic tether connected thereto;
   a processor contained within the vehicle and connected to the electrodynamic tether, the processor configured to cause a current to be directed to the electrodynamic tether to cause a change in motion of the vehicle; and
   a plurality of sensors contained within the vehicle and connected to the processor, wherein the processor is configured to direct current to the electrodynamic tether based upon input received from the plurality of sensors to maintain the vehicle within a specified orbit;
   wherein the specified orbit has an inclination angle that is greater than 63.4 degrees and less than or equal to 90 degrees, with apogee positioned between above 63.4 degrees South latitude and about 90 degrees South latitude.

8. A system comprising:
   a vehicle having an electrodynamic tether connected thereto;
   a processor contained within the vehicle and connected to the electrodynamic tether, the processor configured to cause a current to be supplied to the electrodynamic tether to cause a change in motion of the vehicle;
   a plurality of sensors contained within the vehicle and connected to the processor, wherein the plurality of sensors comprise more than one of an attitude sensor, a position sensor, a magnetometer, and an ionosphere sensor, wherein the processor is configured to direct current to the electrodynamic tether based upon input received from the plurality of sensors to maintain the vehicle within a specified orbit; and
   a communications module, connected to the processor, configured to wirelessly receive additional information and transmit the additional orbit information to the processor, wherein the processor is configured to receive the additional information from the communications module and to modify the current directed to the electrodynamic tether in response to the additional information;
   wherein the specified orbit has an inclination angle that is greater than 63.4 degrees and less than or equal to 90 degrees, with apogee positioned between above 63.4 degrees North latitude and about 90 degrees North latitude.

9. The system of claim 8, wherein the processor is configured in a closed-loop configuration to account for measured errors by the plurality of sensors in one or more of position, attitude, ionospheric charge density, and Earth's magnetic field.

10. The system of claim 8, wherein the vehicle is a satellite.

11. The system of claim 8 further comprising:
    a power supply/control system connected to the processor and the electrodynamic tether; and
    at least one solar array connected to the power supply/control system.

12. A system comprising:
    a vehicle having an electrodynamic tether connected thereto;
    a processor contained within the vehicle and connected to the electrodynamic tether, the processor configured to cause a current to be supplied to the electrodynamic tether to cause a change in motion of the vehicle;
    a plurality of sensors contained within the vehicle and connected to the processor, wherein the plurality of sensors comprise more than one of an attitude sensor, a position sensor, a magnetometer, and an ionosphere sensor, wherein the processor is configured to direct current to the electrodynamic tether based upon input received from the plurality of sensors to maintain the vehicle within a specified orbit; and
    a communications module, connected to the processor, configured to wirelessly receive additional information and transmit the additional orbit information to the processor, wherein the processor is configured to receive the additional information from the communications module and to modify the current directed to the electrodynamic tether in response to the additional information;

wherein the specified orbit has an inclination angle that is greater than 63.4 degrees and less than or equal to 90 degrees, with apogee positioned between above 63.4 degrees South latitude and about 90 degrees South latitude.

13. A method comprising the steps of:

providing a vehicle in orbit, wherein the vehicle comprises an electrodynamic tether connected thereto and a processor contained therein and connected to the electrodynamic tether, wherein the processor is configured to direct current to the electrodynamic tether to cause a change in motion of the vehicle;

receiving, at the processor, input from a plurality of sensors contained within the vehicle and connected to the processor; and maintaining the vehicle within a specified orbit by directing a current to the electrodynamic tether based upon input received from the plurality of sensors;

wherein the specified orbit has an inclination angle that is greater than 63.4 degrees and less than or equal to 90 degrees, with apogee positioned between above 63.4 degrees North latitude and about 90 degrees North latitude.

14. The method of claim 13, wherein the plurality of sensors comprise an attitude sensor, a position sensor, a magnetometer, and an ionosphere sensor.

15. The method of claim 14, wherein the processor is configured in a closed-loop configuration to account for measured errors by the plurality of sensors in one or more of position, attitude, ionospheric charge density, and Earth's magnetic field.

16. The method of claim 15, wherein the providing step further includes providing a communications module connected to the processor, wherein the communications module is configured to wirelessly receive additional information and transmit the additional information to the processor, wherein the method further comprises the step of, at the processor, receiving the additional information from the communications module and modifying the current directed to the electrodynamic tether in response to the additional information.

17. The method of claim 13, wherein the step of maintaining the vehicle within a specified orbit by directing a current to the electrodynamic tether based upon input received from the plurality of sensors comprises sending a signal from the processor to a power supply/control system operatively connected to the electrodynamic tether to cause power from one of a solar array and a battery to be transferred to the electrodynamic tether via the power supply/control system.

18. A method comprising the steps of:

providing a vehicle in orbit, wherein the vehicle comprises an electrodynamic tether connected thereto and a processor contained therein and connected to the electrodynamic tether, wherein the processor is configured to direct current to the electrodynamic tether to cause a change in motion of the vehicle;

receiving, at the processor, input from a plurality of sensors contained within the vehicle and connected to the processor; and maintaining the vehicle within a specified orbit by directing a current to the electrodynamic tether based upon input received from the plurality of sensors;

wherein the specified orbit has an inclination angle that is greater than 63.4 degrees and less than or equal to 90 degrees, with apogee positioned between above 63.4 degrees South latitude and about 90 degrees South latitude.

* * * * *